United States Patent [19]
Kielwein et al.

[11] Patent Number: 5,622,383
[45] Date of Patent: Apr. 22, 1997

[54] SENSOR FOR A SAFETY BELT RETRACTOR

[75] Inventors: Thomas Kielwein, Eschach; Rainer Bareiss, Alfdorf, both of Germany

[73] Assignee: TRW Occupant Restraint Systems GmbH, Alfdorf, Germany

[21] Appl. No.: 583,316

[22] Filed: Jan. 5, 1996

[30] Foreign Application Priority Data

Jan. 12, 1995 [DE] Germany ............... 95 00 722.0

[51] Int. Cl.⁶ ........................................ B60R 22/42
[52] U.S. Cl. ............ 280/806; 280/735; 200/61.45 R; 297/476; 297/479
[58] Field of Search ........................ 280/735, 806; 180/282; 200/61.45 R, 61.52; 297/446, 478, 479, 480

[56] References Cited

U.S. PATENT DOCUMENTS

| | | | |
|---|---|---|---|
| 4,050,644 | 9/1977 | Fohl | 242/107.4 |
| 4,060,004 | 11/1977 | Schole et al. | 200/61.45 R |
| 4,556,177 | 12/1985 | Kuwakado et al. | 242/107.4 |
| 4,618,746 | 10/1986 | Schwob et al. | 200/61.45 R |
| 4,978,087 | 12/1990 | Tauber | 242/107.4 |
| 5,136,127 | 8/1992 | Blair | 200/61.52 |
| 5,358,276 | 10/1994 | Law, Jr. | 200/806 |

FOREIGN PATENT DOCUMENTS

| | | | |
|---|---|---|---|
| 0315955 | 5/1989 | European Pat. Off. | |
| 0364957 | 4/1990 | European Pat. Off. | 280/806 |
| 2258662 | 1/1974 | France | |
| 2377085 | 9/1978 | France | 200/61.45 R |

*Primary Examiner*—Christopher P. Ellis
*Attorney, Agent, or Firm*—Tarolli, Sundheim, Covell, Tummino & Szabo

[57] ABSTRACT

For a sensor for the vehicle-sensitive triggering of the locking mechanism of a safety belt retractor in the back of a vehicle seat, with a ball seat (17) which has a trough (16) for accepting a sensor ball (15), and a pivotally mounted sensor lever (20) resting on the sensor ball (15), the amount of space required for pivoting the sensor in order to maintain the orientation of the sensor irrespective of the inclination of the seat back is to be reduced, without the distance between the tip at the free end of the sensor lever and the circumference of the control disk changing while the sensor is being pivoted. To this end, the sensor (10) is characterised by the ball seat (17) being pivotally mounted around an axis running through the center (C) of the sensor ball (15). In such an arrangement, only the ball seat, but not the entire sensor, is pivoted depending on the inclination of the seat back, which greatly reduces the amount of space required by the sensor; the distance between the tip of the sensor lever and the circumference of the control disk, however, remains unchanged.

6 Claims, 4 Drawing Sheets

SENSOR FOR A SAFETY BELT RETRACTOR

BACKGROUND OF THE INVENTION

The invention relates to a sensor for vehicle-sensitive triggering of a locking mechanism on a safety belt retractor mounted in the back of a vehicle seat.

Such sensors are well known in the field of passenger restraining systems, and their purpose is the vehicle-sensitive triggering of the locking mechanism of a safety belt retractor. This triggering is effected either by changes in the position of the vehicle or through the acceleration/deceleration of the vehicle if this exceeds a predefined triggering threshold. If this triggering threshold is exceeded, then the consequence is that the sensor ball is moved out of the trough of the ball seat. When the position of the vehicle changes, this causes the ball seat with its trough to move in relation to the direction of the forces of gravity acting upon the sensor ball so far that the sensor ball rolls up in the trough. In case of the acceleration or deceleration of the vehicle exceeding the predefined triggering threshold, on the other hand, the sensor ball moves up in the trough of the ball seat through the forces of inertia acting on it. The consequence of this is that the sensor lever resting on the sensor ball is moved away from the trough of the ball seat and engages with the control disk of a safety belt retractor, which is held locked through this engagement and in the known manner triggers a mechanism which locks the retractor from unwinding of belt webbing.

Recently safety belt retractors, which up until now were usually fixed to parts of the vehicle bodywork, have increasingly been attached to the backs of vehicle seats. Since the inclination of these seat backs is adjustable, it is necessary to effect an adjustment of the sensor orientation in the opposite direction, so that the sensor is positioned at all times in the operating position provided for in its design. An example of a type of sensor which is adjustable in its orientation can be seen in EP-A-0 351 551, in which the safety belt arrangement of a vehicle seat which is adjustable in angle is described; here, the sensor triggering the blocking of the safety belt retractor vehicle-sensitively can be pivoted around the axis of the control disk of the safety belt retractor in order to compensate for the changes in the inclination of the seat back. One advantage of such a design is that the distance between the sensor lever and the control disk does not change when the sensor is pivoted. One disadvantage of such a design is the amount of space required by such a sensor, since the latter traverses a large area when it is pivoted due to the great distance between the sensor and the pivot axis.

SUMMARY OF THE INVENTION

An object of the invention is to provide a sensor whereby the space required for pivoting is reduced and nevertheless the distance between the tip of the sensor lever and the circumference of the control disk remains unchanged.

With a sensor of the type mentioned above, this object is achieved by pivotally mounting the ball seat about an axis which extends through the center of the sensor ball. In such an arrangement, only the ball seat, but not the entire sensor, is pivoted depending on the inclination angle of the seat back, which greatly reduces the amount of space required by the sensor; the distance between the tip of the sensor lever and the circumference of the control disk, however, remains unchanged.

Further advantageous developments of the invention arise from the subclaims.

BRIEF DESCRIPTION OF THE DRAWINGS

The preferred version of the invention is described in the following, reference being made to the enclosed drawing. In these.

DESCRIPTION OF THE PREFERRED EMBODIMENTS

Figure 1:
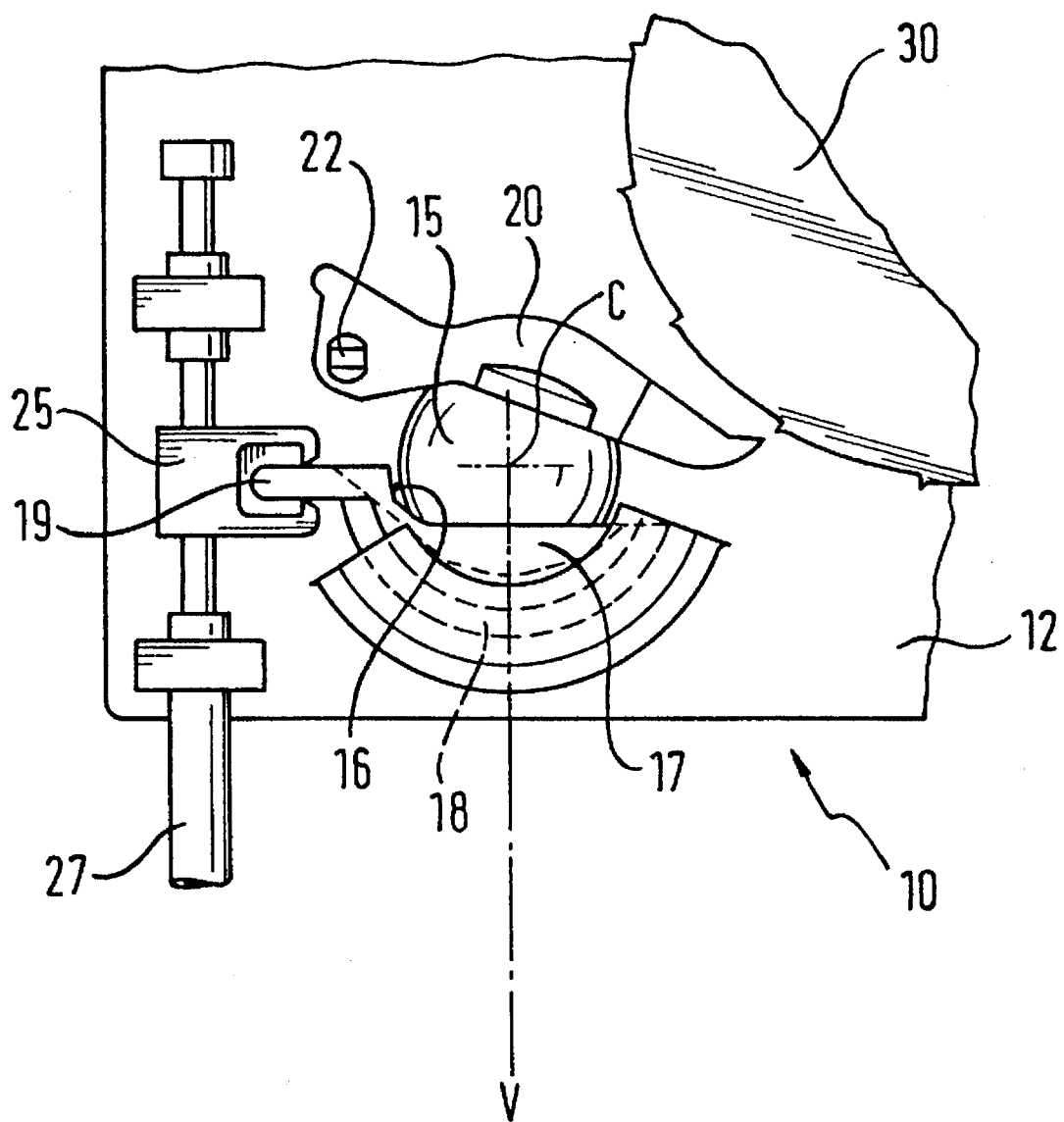
FIG. 1 shows a sensor a first embodiment the invention in a diagrammatic side view in a non-pivoted position.
Figure 2:
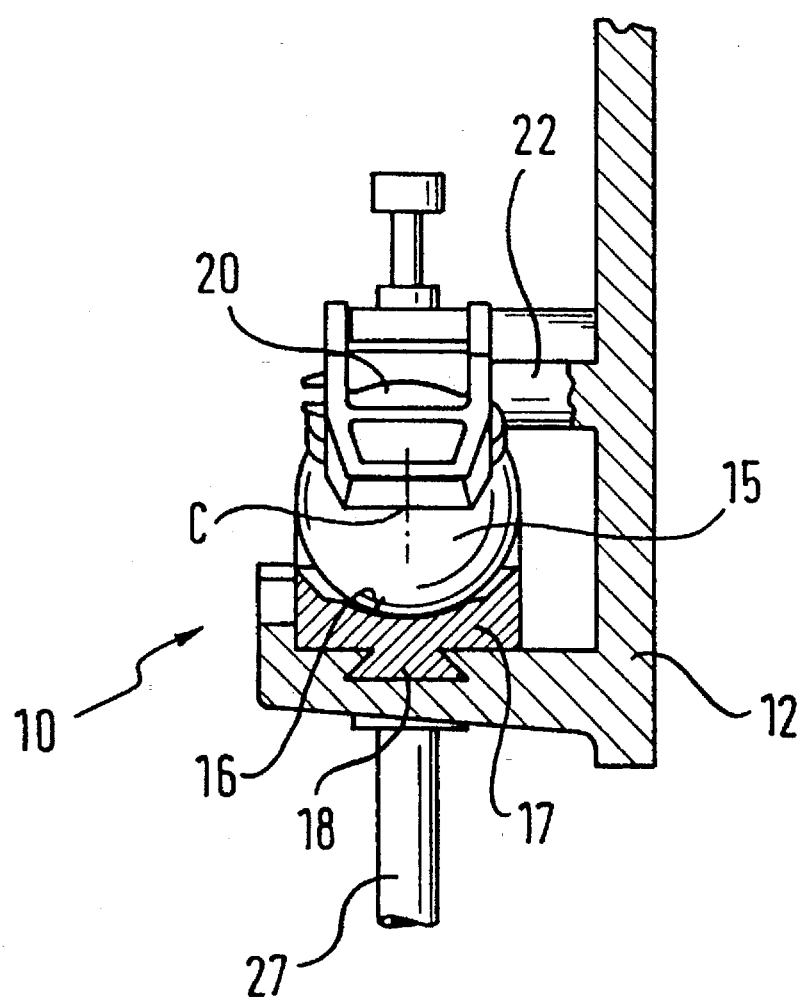
FIG. 2 shows the sensor of FIG. 1 in a partially cut front view.

In FIG. 1 a sensor 10 for the vehicle-sensitive triggering of the locking mechanism of a safety belt retractor (not illustrated) in the back of a vehicle seat is illustrated. This sensor 10 comprises a base plate 12 and a ball seat 17, which has a trough 16 to accommodate a sensor ball 15, and is connected to the base plate 12 by means of a dovetail guide 18, which can be seen more clearly in FIG. 2, which is concentric to the center C of the sensor ball 15. The ball seat 17 is provided with an extension 19 upon which an adjusting element 25 acts. A translatory adjustment of this adjusting element 25 via the extension 19 results in a pivoting movement of the ball seat 17 in the dovetail guide 18 around the center C of the sensor ball 15.

A sensor lever 20, which is mounted on a bolt 22 which is also connected to the base plate 12, rests on the sensor ball 15 located in the trough of the ball seat 17. The sensor lever 20 is intended to be pivoted when the sensor 10 is triggered by a change in the position of the sensor ball 15 in the ball seat 17, and to engage with the tip at its free end in the toothing of the diagrammatically illustrated control disk 30 of the safety belt retractor, whereby this is held locked and a locking of the safety belt retractor is triggered vehicle-sensitively. This is well known to the specialist in the field of passenger safety systems, which is why neither the triggering of the sensor nor the safety belt retractor will be dealt with here in further detail.

In FIG. 1, the sensor 10 is illustrated in its structurally intended operating position, in which the direction of the force of gravity acting on the sensor ball 15 coincides with axis V. Proceeding from this position, if the orientation of sensor 10 changes, the direction of action of the force of gravity acting on the sensor ball 15 assumes, for example, the directions V1 or V2 illustrated in FIG. 3. To ensure that the sensor 10 in these positions also shows triggering behaviour in accordance with the structurally intended behaviour, the ball seat 17 is pivoted by means of the extension 19 of the adjusting element 25. This can be seen in FIG. 3, whereby the adjusting element 25 and the ball seat 17 are illustrated with continuous lines in the position assigned to the direction V2 and with dotted lines in the position assigned to the direction V1. Due to the special design of the dovetail guide 18, the relative positions of the sensor ball 15 and the control disk 30 do not change when the ball seat 17 is pivoted. As well as the triggering behaviour of sensor 10, the distance between the free end of the sensor lever 20 and the circumference of the control disk 30 thus remains unchanged. Since only the ball seat 17 is pivoted, the installation space required for the sensor 10 is very small.

Figure 3:
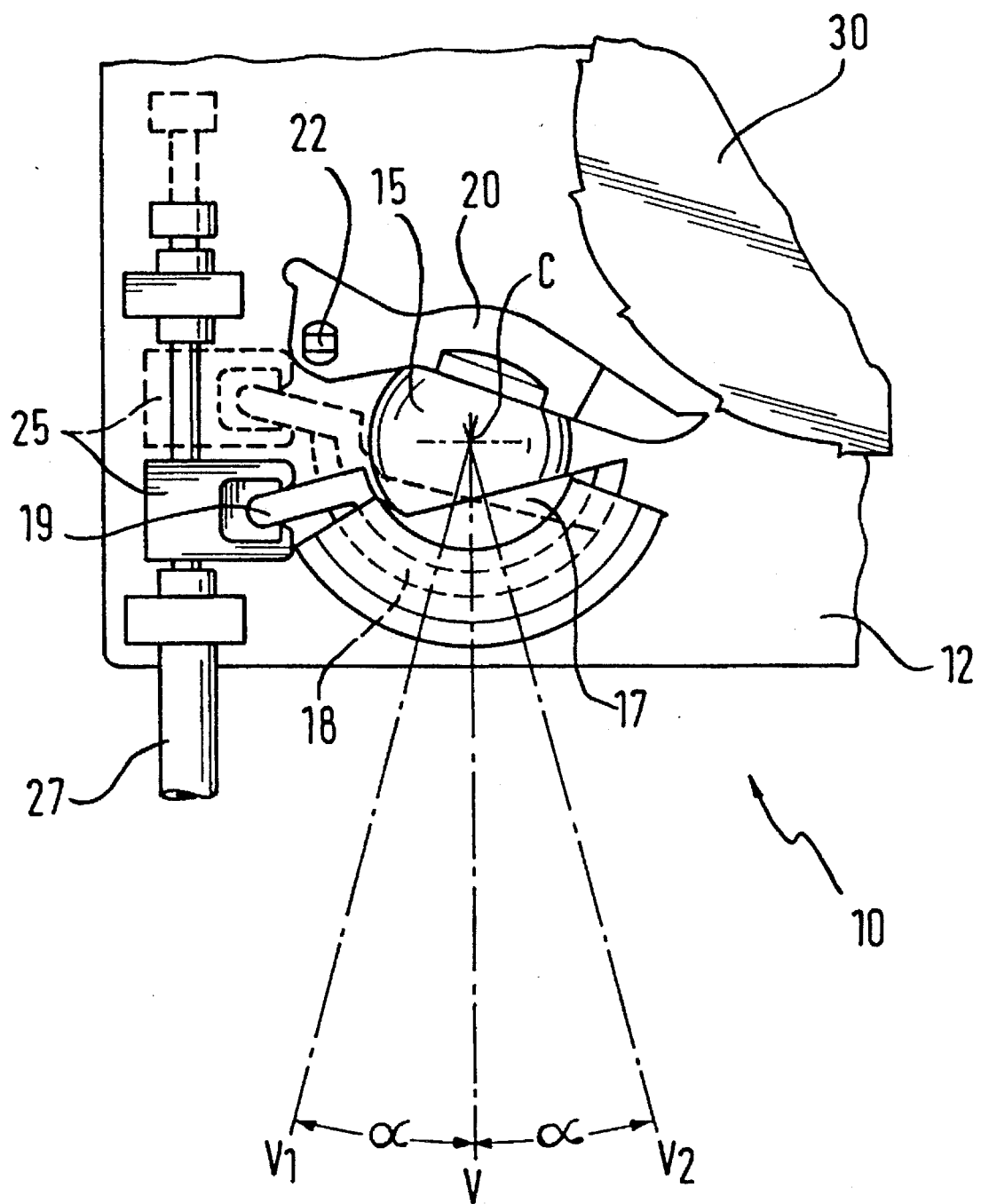
FIG. 3 shows the sensor of FIG. 1 in a diagrammatic side view in two pivoted positions.

The pivoting of the ball seat 17 from the initial position illustrated in FIG. 1 to the pivoted positions illustrated in FIG. 3 is effected by a translatory movement of the adjusting element 25; this movement is caused by an adjusting device 27, whose end on the sensor side is connected to the sensor base plate 12. This adjusting device 27 can be a push-pull member like a Bowden cable, with which the adjusting element 25 is rigidly connected. An adjustment of the push-pull member 27 in its longitudinal direction effects a corresponding translatory movement of the adjusting element 25, which leads to a a pivoting of the ball seat 17 around the center C of the sensor ball 15 via the extension 19.

Figure 4:
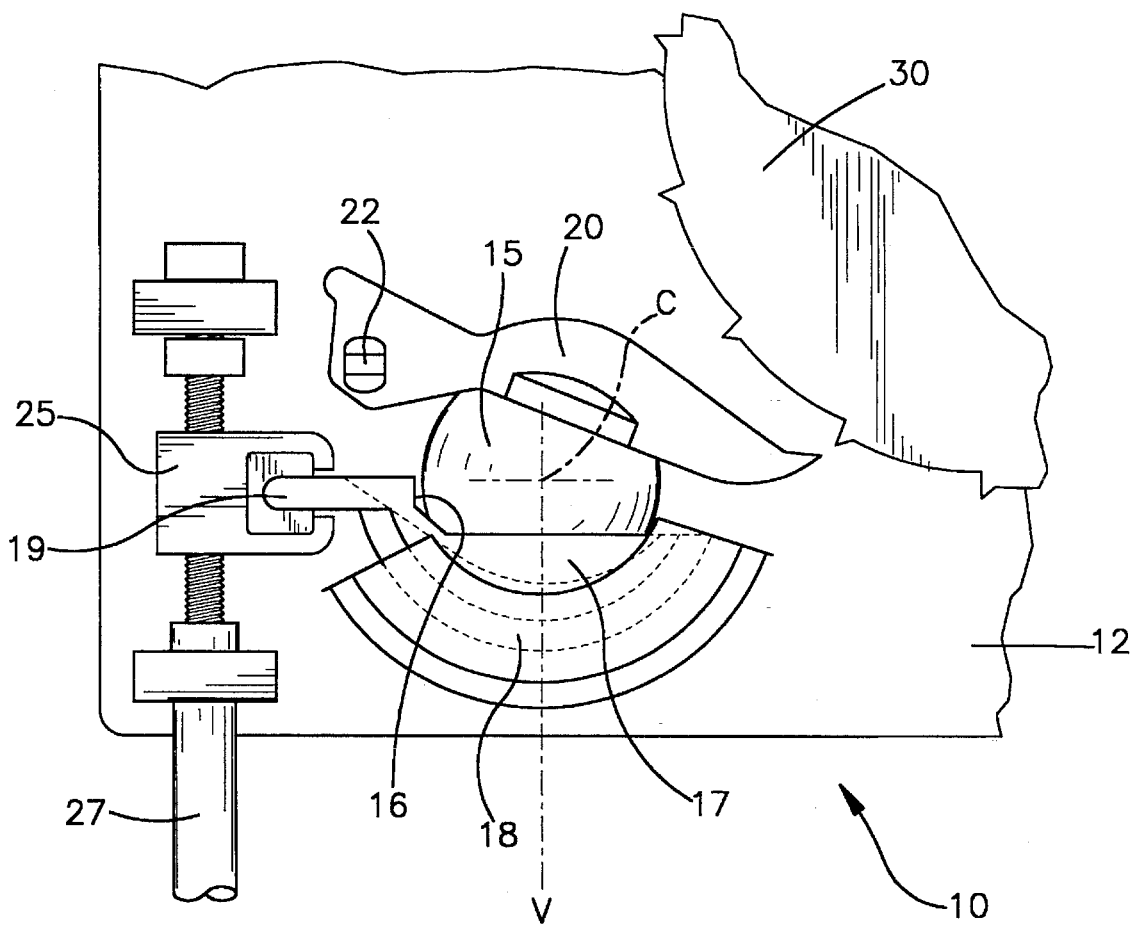
FIG. 4 shows a sensor in accordance with a second embodiment of the invention in a diagrammatic side view in a non-pivoted position.

The adjusting element 27 can also be a rotatable load transmission member, as illustrated in FIG. 4 whose rotating movement is converted into a translatory movement of the adjusting element 25 on the sensor side of the adjustment device 27, e.g. by means of a thread on the sensor side of the rotatable load transmission member 27 and on which the adjusting element 25, which is provided with a complementary thread, is located. Therefore, a rotation of the rotatable load transmission member 27 thus has the same effect as a translatory movement of the push-pull member.

The end of the adjusting device 27 (not illustrated) opposite to the sensor end of the adjusting device 27 is connected to a suitable device like a gear box (not illustrated) which measures the pivoting of the back of the vehicle seat and ensures an effect on the adjusting element 25 such that the orientation of the sensor 10 is retained irrespective of the inclination of the seat back.

What is claimed is:

1. A sensor for vehicle-sensitive triggering of a locking mechanism on a safety belt retractor mounted in the back of a vehicle seat, comprising a ball seat which has a trough for accommodation of a sensor ball and a pivotally mounted sensor lever resting on said sensor ball, said ball seat being mounted so as to pivot about an axis which extends through the center of said sensor ball.

2. The sensor as set forth in claim 1, wherein said ball seat is provided with an extension engaged by an adjusting element.

3. The sensor as set forth in claim 2, wherein said adjusting element performs a translatory movement.

4. The sensor as set forth in claim 2, wherein said adjusting element is subject to movement through a push-pull member.

5. The sensor as set forth in claim 2, wherein said adjusting element is subject to movement through a rotatable load transmission member.

6. The sensor as set forth in claim 1, wherein said ball seat is connected to a sensor base plate by means of an arcuate dovetail guide having a curvature concentric with said sensor ball.

\* \* \* \* \*

UNITED STATES PATENT AND TRADEMARK OFFICE
CERTIFICATE OF CORRECTION

PATENT NO. : 5 622 383
DATED : April 22, 1997
INVENTOR(S) : Thomas Kielwein and Rainer Bareiss It is certified that error appears in the above-indentified patent and that said Letters Patent is hereby corrected as shown below:

Title page, item [30]
    Foreign Application Priority Data Section, change "95 00 722.0" to --195 00 722.0--.

Signed and Sealed this

Fifteenth Day of September, 1998

Attest:

BRUCE LEHMAN

Attesting Officer

Commissioner of Patents and Trademarks